United States Patent
Hoghoj (10) Patent No.: US 11,029,265 B2
(45) Date of Patent: Jun. 8, 2021

(54) X-RAY SCATTERING APPARATUS

(71) Applicant: XENOCS SAS, Grenoble (FR)

(72) Inventor: Peter Hoghoj, Sassenage (FR)

(73) Assignee: XENOCS SAS, Grenoble (FR)

(*) Notice: Subject to any disclaimer, the term of this patent is extended or adjusted under 35 U.S.C. 154(b) by 328 days.

(21) Appl. No.: 16/301,980

(22) PCT Filed: May 17, 2017

(86) PCT No.: PCT/EP2017/061894
§ 371 (c)(1),
(2) Date: Nov. 15, 2018

(87) PCT Pub. No.: WO2017/198736
PCT Pub. Date: Nov. 23, 2017

(65) Prior Publication Data
US 2019/0170669 A1   Jun. 6, 2019

(30) Foreign Application Priority Data

May 20, 2016 (EP) .................................... 16290087

(51) Int. Cl.
*G01N 23/201* (2018.01)
*G01N 23/20* (2018.01)
*G01N 23/20008* (2018.01)

(52) U.S. Cl.
CPC ....... *G01N 23/20008* (2013.01); *G01N 23/20* (2013.01); *G01N 23/201* (2013.01); *G01N 2223/50* (2013.01); *G01N 2223/501* (2013.01)

(58) Field of Classification Search
CPC ............ G01N 23/20008; G01N 23/20; G01N 23/201; G01N 2223/50; G01N 2223/501
See application file for complete search history.

(56) References Cited

U.S. PATENT DOCUMENTS

2006/0062351 A1* 3/2006 Yokhin ............ G01N 23/20008
378/86
2008/0175352 A1* 7/2008 Kogan ................. G01N 23/201
378/81

(Continued)

FOREIGN PATENT DOCUMENTS

CN 102792156 A 11/2012
CN 103207195 B 1/2015

OTHER PUBLICATIONS

Vallenhag et al., A combined small- and wide-angle x-ray scattering detector for measurements on reactive systems, Aug. 10, 2011, Review of Scientific Instruments, vol. 82, Iss. 8, pp. 1-8 (Year: 2011).*

(Continued)

*Primary Examiner* — David P Porta
*Assistant Examiner* — Jeremy S Valentiner
(74) *Attorney, Agent, or Firm* — Notaro, Michalos & Zaccaria P.C.

(57) ABSTRACT

An X-ray scattering apparatus has a sample holder for aligning and orienting a sample to be analyzed by X-ray scattering, an X-ray beam delivery system arranged upstream of the sample holder for generating and directing a direct X-ray beam along a propagation direction towards the sample holder, a proximal X-ray detector arranged downstream of the sample holder as to let the direct X-ray beam pass and detect X rays scattered from the sample, and a distal X-ray detector arranged downstream of the sample holder and movable along the propagation direction (X) of the direct X-ray beam in which the proximal X-ray detector is also movable essentially along the propagation direction of the direct X-ray beam.

15 Claims, 4 Drawing Sheets

(56) References Cited

U.S. PATENT DOCUMENTS

2013/0101091 A1 4/2013 Garvey et al.
2015/0369759 A1* 12/2015 Mazor .................. G01N 23/207
378/89

OTHER PUBLICATIONS

International Search Report and Written Opinion for corresponding PCT application No. PCT/EP2017/061894, dated Jun. 9, 2017.
Liu Yi, "Concept design of small angle X-ray scattering beamline and station in SSRF", Nuclear Techniques, vol. 29, No. 4, pp. 245-248, Apr. 30, 2006 (see abstract at end of document for English translation).
Vallenhag Linda; Canton Sophie E; Sondhauss Peter; Haase Darthe; Ossler Frederik, "A combined small- and wide-angle x-ray scattering detector for measurements on reactive systems", Review of scientific instruments, Aug. 1, 2011 AIP, Melville, NY, US-ISSN 0034-6748, vol. 82, Nr:8, pp. 83104-83104-8, http://dx.doi.org/10.1063/1.3613958, downloaded Mar. 2, 2021.
Chinese office action for corresponding Chinese application No. CN 2017800313192, dated Jan. 28, 2021.

* cited by examiner

X-RAY SCATTERING APPARATUS

The present invention relates to an X-ray scattering apparatus.

While Wide Angle X-ray Scattering (WAXS) typically gives access to information on crystalline structure and phase(s) of a sample to be analyzed, Small Angle X-ray Scattering (SAXS) typically gives access to information about the sample structure on the nano-scale level (nanostructure). As both crystalline phase and nanostructure influence material properties, there is an interest in performing both SAXS and WAXS on the same sample and on the same instrument. Being able to simultaneously perform SAXS and WAXS allows for correlating sample crystalline and nano-scale structure and identify changes induced by the sample environment such as tensile stress or temperature.

A conventional X-ray scattering apparatus, comprising:
- a sample holder for aligning and orienting the sample to be analyzed by X-ray scattering;
- an X-ray beam delivery system arranged upstream of the sample holder for generating and directing a direct X-ray beam along a propagation direction (X) towards the sample holder;
- a proximal X-ray detector arranged downstream of the sample holder such as to let the direct X-ray beam pass and detect X rays scattered from the sample; and
- a distal X-ray detector arranged downstream of the sample holder and
- movable along the propagation direction (X) of the direct X-ray beam is commercially available from the applicant under the name "Xeuss 2.0".

The X-ray beam delivery system of this conventional X-ray scattering apparatus comprises an X-ray source, for example a Cu or Mo source for generating X-rays, and an optics and collimation system for directing and conditioning the generated X-ray beam along the essentially horizontal propagation direction towards the sample holder which may comprise a motorized translation and/or rotation stage, a vacuum chamber and other typical sample stage devices known in the field of X-ray scattering.

This conventional X-ray scattering apparatus comprises two X-ray detectors which are both arranged downstream of the sample holder, i.e. on a side of the sample holder opposite to the side of the X-ray beam delivery system:

The proximal X-ray detector is located at a fixed distance from the sample holder at a position below the direct X-ray beam so that it does not intercept the direct X-ray beam. A typical horizontal distance of the proximal X-ray detector from the sample holder in a direction along the direct X-ray beam is approximately 150 mm, a typical vertical off-set of the proximal X-ray detector from the direct beam is approximately a few mm. Depending on the positional details of the proximal X-ray detector and the size of its sensor, it is typically able to detect X-rays scattered from the sample at a scattering angle with respect to the direct X-ray beam between a minimum scattering angle $2\theta_{min}$ of approximately 15° and a maximum scattering angle $2\theta_{max}$ of approximately 45°-60°. The proximal X-ray detector is thus suitable for Wide Angle X-ray Scattering (WAXS) providing information on crystalline structure and phase(s) of the sample.

The distal X-ray detector is mounted on a detector stage which allows for manual translation along the propagation direction of the direct beam at much larger horizontal distances from the sample holder, typically in a range between 300 mm and 6500 mm. Depending on the positional details of the distal X-ray detector and the size of its sensor, it is typically able to detect X-rays scattered from the sample at scattering angles with respect to the direct X-ray beam as small as approximately $2\theta=0.05°$. The distal X-ray detector is thus suitable for Small Angle X-ray Scattering (SAXS) providing information on the sample structure at the nano-scale level.

However, depending on the sample and structure of interest, different angular ranges of the scattered radiation are of interest, both in the SAXS and WAXS regime. Furthermore, in the case of anisotropic structure of the sample being studied a large azimuthal coverage of the SAXS and WAXS measurements is of interest in order to understand and quantify orientation, texture and structure. For anisotropic samples like fibers, or samples with oriented structure after mechanical deformation, it is recommended that such azimuthal coverage is in the range of 200° for the scattered signal of interest, in order to be able to interpret the spatial orientation by axial symmetry. For certain systems a nearly full 360° azimuthal coverage is required. For instruments used for different types of samples and/or measurements, such as multi-user, central or service-facilities, it is therefore desirable to be able to adjust both the SAXS and WAXS measurement capabilities of the instrument to the optimum configuration for obtaining the desired measurement and information about the sample.

It is therefore an object of the invention to propose an improved X-ray scattering apparatus of the above type which allows to cover a larger angular range of the scattered radiation.

According to the invention this object is achieved by an X-ray scattering apparatus of the above type, wherein the proximal X-ray detector is also movable essentially along the propagation direction (X) of the direct X-ray beam.

In addition to the known possibility to move the distal X-ray detector along the propagation direction of the direct X-ray beam, also the proximal X-ray detector can then be moved essentially along the same direction in a range between a minimum distance and a maximum distance from the sample. The minimum distance is essentially determined by the size of the proximal X-ray detector itself and the size of the sample holder or the sample stage mounted thereon. When located at the minimum distance the proximal X-ray detector can be used for WAXS measurements in the conventional way. The maximum distance is essentially determined by the respective distance of the distal X-ray detector from the sample holder. When located at the maximum distance from the sample, depending on the specific amount of said maximum distance, the proximal X-ray detector can serve as a second SAXS detector in addition to the distal X-ray detector in order to increase the azimuthal angular coverage. Locating the proximal X-ray detector at a position between the minimum and maximum distance from the sample thus allows to optimize the angular coverage of the detector with respect to the measurement of sample structure and material phases to be characterized.

In a preferred embodiment the proximal X-ray detector and the distal X-ray detector are movable with respect to each other between at least one first measurement configuration in which the distal X-ray detector is arranged downstream of the proximal X-ray detector and at least one second measurement configuration in which the distal X-ray detector and the proximal X-ray detector are located at approximately equal distances from the sample holder.

In the at least one first measurement configuration the distances of the proximal and the distal X-ray detectors from the sample holder are preferably selected such that the proximal X-ray detector allows measurement of WAXS scattering signals and the distal X-ray detector allows measurement of SAXS scattering signals.

In the at least one second measurement configuration the proximal and the distal X-ray detectors are preferably arranged such as to form a joint X-ray detector.

In this latter case it is preferred that in the at least one second measurement configuration the individual detection surfaces of the proximal and the distal X-ray detectors form an essentially continuous joint detection surface of the joint X-ray detector.

In order to achieve such a continuous joint detection surface it is advantageous if in the at least one second measurement configuration the proximal X-ray detector is located slightly closer to the sample than the distal X-ray detector. "Slightly closer" means that the distance between the proximal X-ray detector and the distal X-ray detector in the horizontal direction, i.e. along the propagation direction of the direct X-ray beam is sufficiently large to prevent their respective housings from getting into contact which will usually cause a gap in the joint detection surface.

In this preferred embodiment of the X-ray scattering apparatus according to the invention it is furthermore considered advantageous if in the at least one second measurement configuration the center of the joint X-ray detector essentially coincides with a projection of the direct X-ray beam. This allows to take the maximum advantage of the joint detection surface of the joint X-ray detector in terms of azimuthal scattering angle to be measured.

The X-ray scattering apparatus according to the invention may furthermore comprise a beam stop for preventing the direct X-ray beam from reaching the distal X-ray detector, wherein said beam stop is mounted such that it is displaced together with the distal X-ray detector when said distal X-ray detector is moved along the propagation direction (X) of the direct X-ray beam. The beam stop can for example be attached to a detector stage on which the distal X-ray detector is mounted, or it can directly be attached to the housing of the distal X-ray detector. Depending on the detector technology and its capability to withstand the direct beam, the beam stop can be fully absorbing or semi-transparent in order to only attenuate the direct beam which could be advantageous for absolute scattering intensity measurements by measuring the direct beam and scattered beam with the same detector.

In a preferred embodiment the proximal X-ray detector and/or the distal X-ray detector is furthermore movable in a plane (YZ) essentially orthogonal to the propagation direction (X) of the direct X-ray beam. These degrees of freedom can be achieved by mounting the proximal X-ray detector and/or the distal X-ray detector on a motorized detector stage allowing for translational movement along the Y and/or Z direction. This allows to further increase the angular coverage of the WAXS and/or SAXS measurements or to emulate a continuous detection surface in the case of detectors having inactive areas.

When a beam stop as discussed above is used with this preferred embodiment, said beam stop should advantageously be mounted such that it is not displaced together with the distal X-ray detector when said distal X-ray detector is moved in said plane (YZ) essentially orthogonal to the propagation direction (X) of the direct X-ray beam. This makes sure that the beam stop accomplishes its essential task of blocking or attenuating the direct X-ray beam.

Advantageously the proximal X-ray detector and/or the distal X-ray detector is tiltable such that a normal to its detection surface is essentially directed to the sample holder. These degrees of freedom can be achieved by mounting the proximal X-ray detector and/or the distal X-ray detector on a detector stage—the same one or a different one as is used for the translational movements in the YZ plane—that can be tilted around the Y axis and around the Z axis. Irrespective of its specific position in the YZ plane it can then always be made sure that the respective detector "looks at" the sample thus avoiding parallax errors during measurement.

In a preferred embodiment of the X-ray scattering apparatus according to the invention, the proximal X-ray detector and the distal X-ray detector are each movable on an individual rail or are both movable on a common rail. In both cases the required movability of the detector along the X direction, i.e. parallel to the propagation direction of the X-ray beam, is achieved.

Preferably the proximal X-ray detector and/or the distal X-ray detector comprises an X-ray sensor movable along the propagation direction (X) of the direct X-ray beam connected to counting electronics at least part of which is located at a different position than the X-ray sensor, wherein advantageously the part of the counting electronics of the movable X-ray sensors of the proximal X-ray detector and/or the distal X-ray detector which is located at a different position than the respective X-ray sensor is a common part to both X-ray detectors. Such an arrangement makes it particularly easy to electronically implement the joint detection surface of the two sensors of the detectors.

Generally any kind of X-ray detector can be used in the X-ray scattering apparatus according to the present invention. Preferably, however, detectors should be selected in which the detection surfaces of the movable X-ray sensors are limited on at least one side by the borders only of the active areas of the respective sensors. In this case the detection surfaces of the movable X-ray sensors extend to the respective borders of the sensors where there is no "blind zone". Such blind zones could be caused by the sensor characteristics or by the sensor housings. Using such sensors without blind zones at least at one border makes it easy to combine their individual detection surfaces to the joint detection surface without any gap in between. Particularly preferred are sensors that have no such blind zones at all so that the detection surfaces extend over the entire areas of the respective sensors. In the alternative case of sensors having some blind zones at their borders it should preferably be made sure that these blind zones are not located in the junction area.

In addition to or as an alternative to the above described movability of at least one of the detectors in the YZ plane and its tiltability around the Y axis and/or around the Z axis, the proximal X-ray detector and/or the distal X-ray detector may furthermore be rotatable about at least one axis lying in the plane (YZ) essentially orthogonal to the propagation direction (X) of the direct X-ray beam. In case of rotatability around an axis passing through the sample position the apparatus according to the invention then allows to carry out WAXS measurements at large scattering angles relative to the direct beam.

A preferred embodiment of the X-ray scattering apparatus according to the invention will be described in the following with reference to the attached drawings, in which.

Figure 1A:
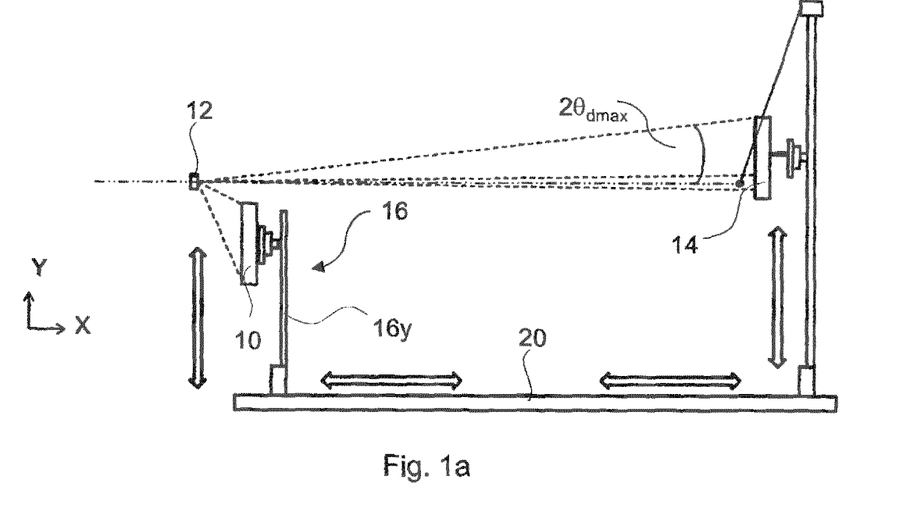
FIG. 1a shows a schematic side view of the X-ray scattering apparatus in a $1^{st}$ position.
Figure 1B:
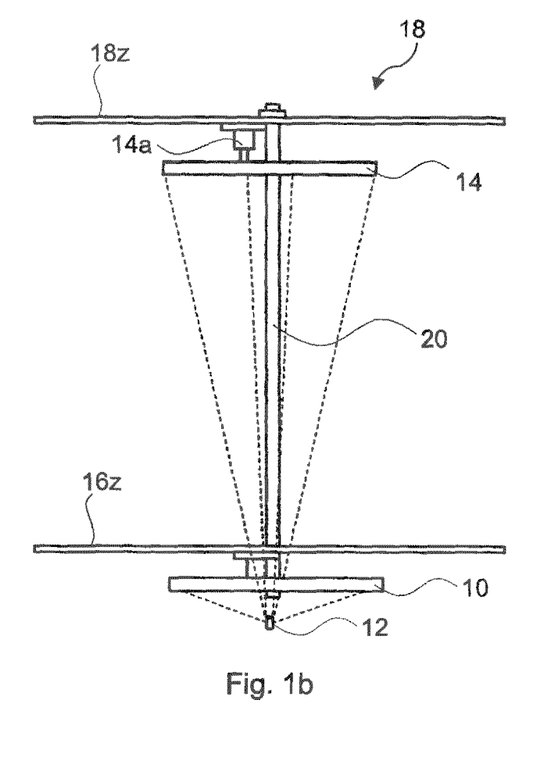
FIG. 1b shows a schematic top view of the X-ray scattering apparatus in the $1^{st}$ position.

FIGS. 1a and 1b show a schematic side view and a schematic top view, respectively, of a preferred embodiment of the X-ray scattering apparatus according to the invention in a $1^{st}$ position. The apparatus comprises a proximal X-ray detector 10 arranged downstream of a sample holder (not shown) for holding a sample 12 to be analyzed by X-ray scattering in a holding position. A distal X-ray detector 14 is arranged downstream of the proximal X-ray detector 10. The terms "upstream" and "downstream" refer to the propagation direction X of the direct X-ray beam arriving from an X-ray beam delivery system (not shown) arranged upstream of the sample holder for generating and directing a direct X-ray beam along the propagation direction X towards the sample holder. Such X-ray beam delivery systems typically comprise an X-ray generator, for example a microfocus sealed tube source or rotating anode tube, a collimating or focusing monochromator for selecting a predetermined X-ray wavelength such as multilayer coated x-ray mirrors, and slits for shaping the profile of the X-ray beam arriving at the sample holder and controlling its divergence and shape towards the distal X-ray detector, and further X-ray equipment known to the skilled person. In FIG. 1a and all other side views the direction from upstream to downstream is therefore from left to right. In FIG. 1b and all other top views the direction from upstream to downstream is from bottom to top. The X-ray beam delivery system can generate a 1D conditioned X-ray beam using a line focus source and 1D X-ray beam shaping optics. In a preferred embodiment, the X-ray beam delivery system generates a 2D conditioned X-ray beam using a point focus and 2D X-ray beam shaping optics. In such a case the distal X-ray detector and the proximal X-ray detector can have a 2D array of pixels adapted for the analysis of anisotropic samples. X-ray scattering measurements usually require beam path evacuation under vacuum or helium to reduce the generation of parasitic scattering from air. The scattering beampath thus usually requires to be in vacuum and in a preferred embodiment both proximal X-ray detector and distal X-ray detector are located inside a vacuum diffracted beam pipe which can be connected to a vacuum sample chamber or part of single volume chamber including the incident beam path and sample chamber.

The proximal X-ray detector 10 is mounted on a proximal detector stage 16, and the distal X-ray detector 14 is mounted on a distal detector stage 18. Each of these stages 16, 18 comprises detector rails 16y,z and 18y,z, respectively, which allow for independent translation of the respective detector 10, 14 in two orthogonal directions Y and Z perpendicular to the beam propagation direction X. Displacement of the detector stages 16, 18 along the Y direction is schematically indicated in the figures by vertical double arrows. Furthermore each of these stages 16, 18 allows for independent tilting of the respective detector 10, 14 about these directions Y and Z in order to make sure that a normal to a detection surface of the respective detector 10, 14 can always be essentially directed to the sample holder. These translational and/or rotational movements allow to increase the data collection surface during SAXS/WAXS measurements using sequential exposures or a unique exposure at predetermined coordinates of the respective detector 10, 14.

In addition the stages 16, 18 may also allow for a further rotation of the respective detector 10, 14 about the X direction.

In the $1^{st}$ position shown in FIGS. 1a and 1b the proximal X-ray detector 10 may be as close to the sample 12 as for example 0.15 m, depending on the size of the sample holder, the sample 12 itself and the size of the potential vacuum or other sample chamber in which the sample holder is arranged. Thus the proximal X-ray detector 10 can be used for WAXS measurements in the $1^{st}$ position.

The distal X-ray detector 14 may be as far away from the sample 12 as for example 10 m. Thus the distal X-ray detector 14 can be used for SAXS measurements in the $1^{st}$ position. Preferably the distances of the detectors 10, 14 from the sample 12 in said $1^{st}$ position are chosen such that in the Y direction and/or the Z direction a maximum scattering angle $2\theta_{dmax}$ detectable by the distal X-ray detector 14 is larger than a minimum scattering angle $2\theta_{pmin}$ detectable by the proximal X-ray detector 10. This overlap in momentum transfers Q enables the measurement of the scattered radiation over a continuous range of angles extending from SAXS to WAXS. The scattered X-ray beams corresponding to the scattering angles $2\theta_{dmax}$ and $2\theta_{pmin}$ are indicated as dotted lines in FIG. 1a. The direct beam transmitted through the sample 12 is indicated as a dot and dash line. The scattered X-ray beams corresponding to the scattering angles $2\theta_{dmin}$, $2\theta_{pmax}$ which correspond respectively to the minimum scattering angle detectable by the distal X-ray detector 14 and the maximum scattering angle detected by the proximal X-ray detector 10 are also indicated as dotted lines in FIG. 1a.

Figure 1C:
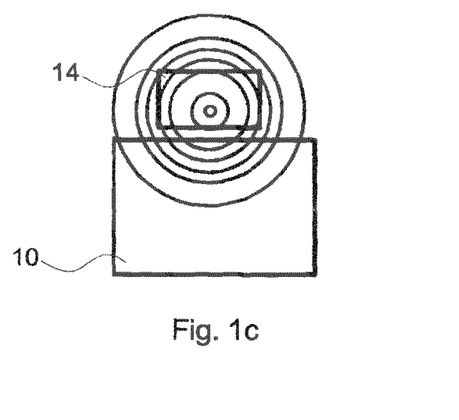
FIG. 1c shows a schematic front view of the two detectors of the apparatus, the scattered X-ray wave field and the direct beam in the $1^{st}$ position.

FIG. 1c shows a schematic front view of the two detectors 10, 14 of the apparatus, the scattered X-ray wave field and the direct beam in the $1^{st}$ position. The distal X-ray detector 14 is represented considerably smaller than the proximal X-ray detector 10 as a consequence of its much larger distance from the sample 12. The above-mentioned overlap in momentum transfer Q during X-ray scattering is graphically represented by the fact that some parts of the scattered wave field indicated as circles hit both detectors 10, 14.

The detector stages 16, 18 of both detectors 10, 14 are mounted on a common rail 20 essentially extending along the propagation direction X of the direct X-ray beam. Each stage 16, 18 can essentially be independently displaced along the common rail 20, as is schematically indicated in the figures by horizontal double arrows. Displacement of the detector stages 16, 18 can be accomplished manually and/or by means of electric motors. Therefore the proximal X-ray detector 10 can essentially be displaced between the sample 12 and a current position of the distal X-ray detector 14 which in turn can essentially be displaced between the current position of the proximal X-ray detector 10 and the distal end of the common rail 20. As a consequence the proximal X-ray detector 10 and the distal X-ray detector 14 are movable with respect to each other between at least one first measurement configuration in which the distal X-ray detector 14 is arranged downstream of the proximal X-ray detector 10, see for example the $1^{st}$ position shown in FIGS. 1a and 1b, and at least one second measurement configuration in which the distal X-ray detector 14 and the proximal X-ray detector 10 are located at approximately equal distances from the sample holder, see for example the $2^{nd}$ position shown in FIGS. 2a and 2b.

In order to allow an arrangement of the detectors 10, 14 essentially one above the other along the Y direction whereas their respective detector stages 16, 18 are positioned behind each other on the common rail 20 along the X direction, the distal X-ray detector 14 is mounted to its detector stage 18 via a holder extension 14a extending along the X direction.

Figure 2A:
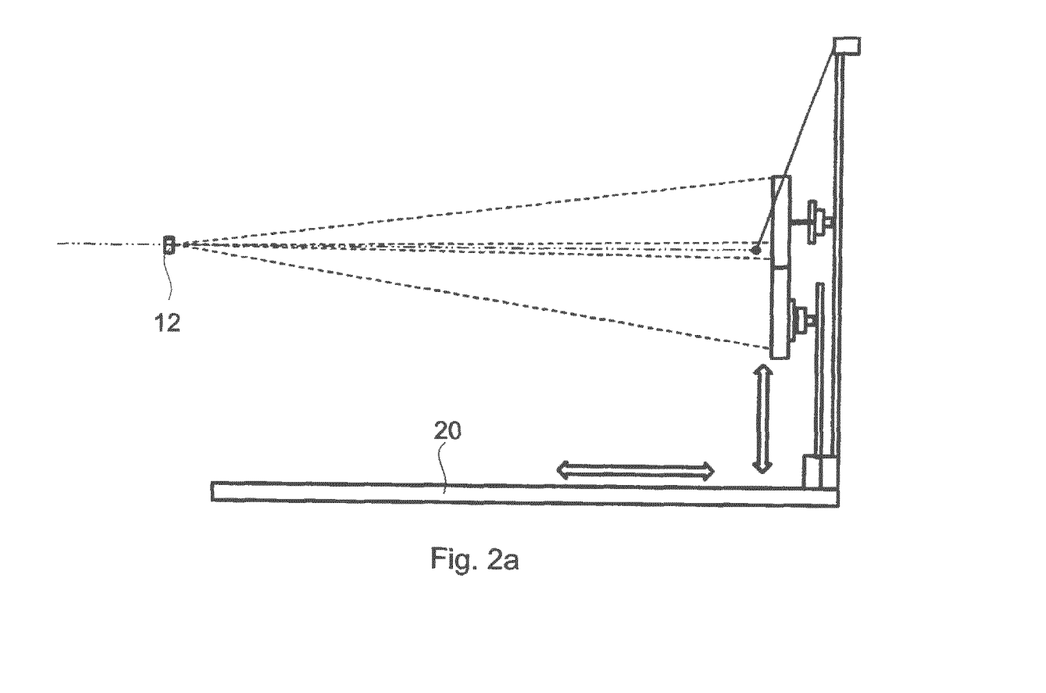
FIG. 2a shows a schematic side view of the X-ray scattering apparatus in a $2^{nd}$ position.
Figures 2B, 2C:
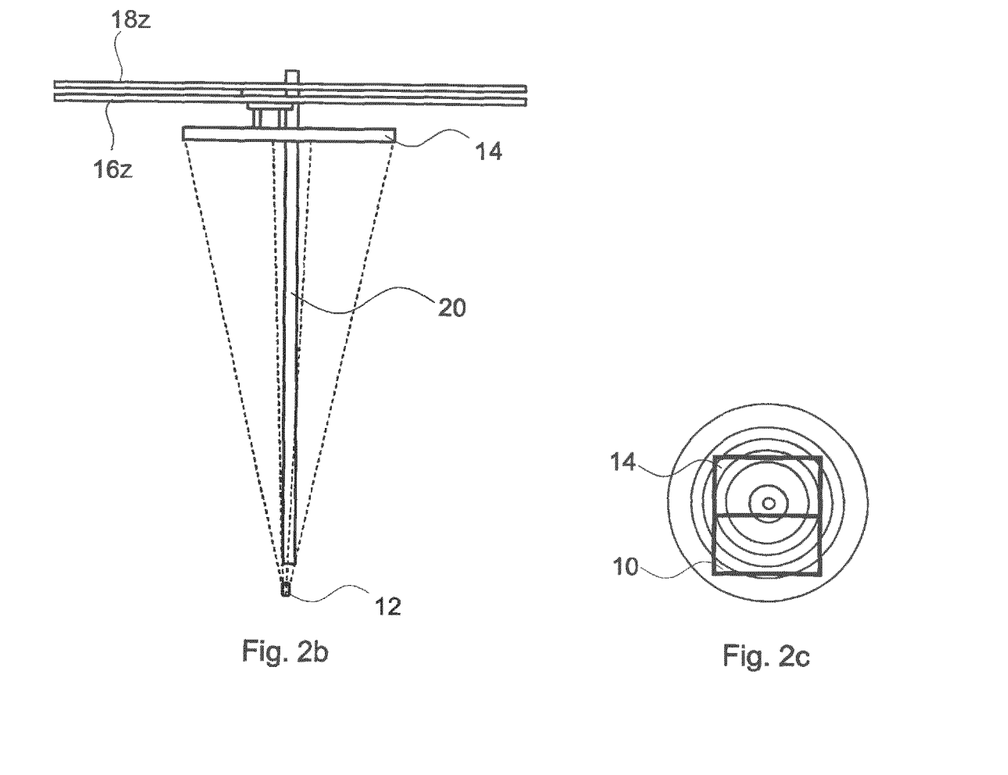
FIG. 2b shows a schematic top view of the X-ray scattering apparatus in the $2^{nd}$ position.
FIG. 2c shows a schematic front view of the two detectors of the apparatus, the scattered X-ray wave field and the direct beam in the $2^{nd}$ position.

In the $2^{nd}$ position shown in FIGS. 2a and 2b as a specific example of the second measurement configuration, the proximal and the distal X-ray detectors 10, 14 can form a joint X-ray detector for SAXS measurements over a large range of azimuthal angles, with their individual detection surfaces forming an essentially continuous joint detection surface of the joint X-ray detector. In such case both the proximal and the distal X-ray detector 10, 14 are placed at a relatively long distance (typically from 0.3 m to 10 meters) for SAXS measurements.

FIG. 2c shows a schematic front view of the two detectors 10, 14 of the apparatus, the scattered X-ray wave field and the direct beam in the $2^{nd}$ position. Both detectors 10, 14 are represented having the same size since they have the same distance from the sample 12.

Usually an opaque or semi-transparent beam stop is provided (not shown) for preventing or attenuating the direct X-ray beam from reaching the distal X-ray detector 14. Such a beam stop may for example be mounted on a specific beam stop stage that can be easily placed on and removed from the common rail 20 for translational displacement along the common rail 20. The beam stop stage may comprise means for a manual and/or motorized displacement of the beam stop in the Y-Z-plane for alignment with respect to the direct X-ray beam. Such motorized displacement can also be use to expose the direct beam on the distal X-ray detector for short period in order to detect very low angles of scattering, when such detector has the capability to withstand X-ray radiation and has a good measuring dynamic range. The beam stop stage should preferably be formed such as to minimize any shadowing effect on the distal X-ray detector 14 and possibly on the proximal X-ray detector 10 if the second measurement configuration is chosen. In all cases shown in the figures said beam stop should preferably be positioned close to and upstream of the distal X-ray detector 14.

Figure 3A:
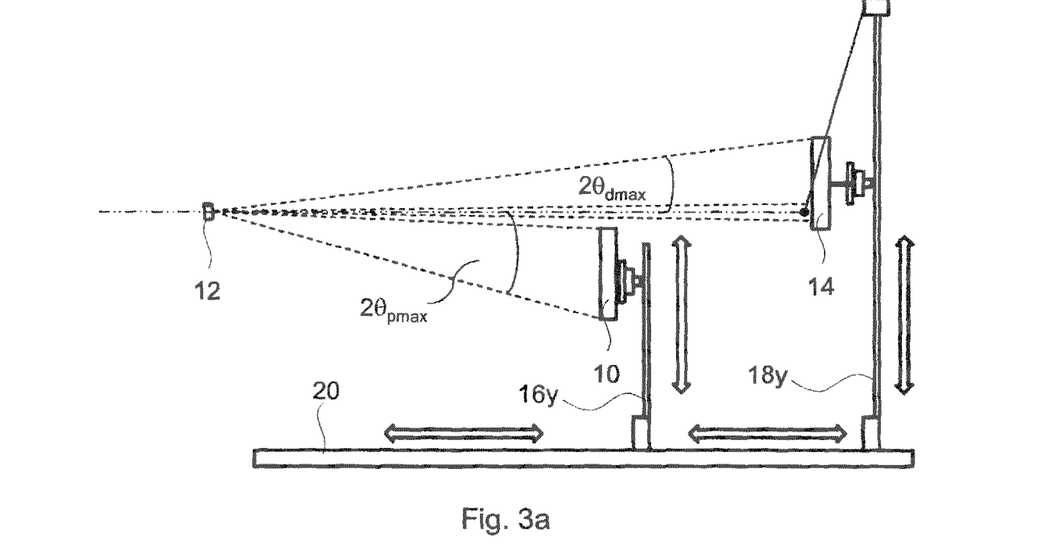
FIG. 3a shows a schematic side view of the X-ray scattering apparatus in a $3^{rd}$ position.
Figure 3B:
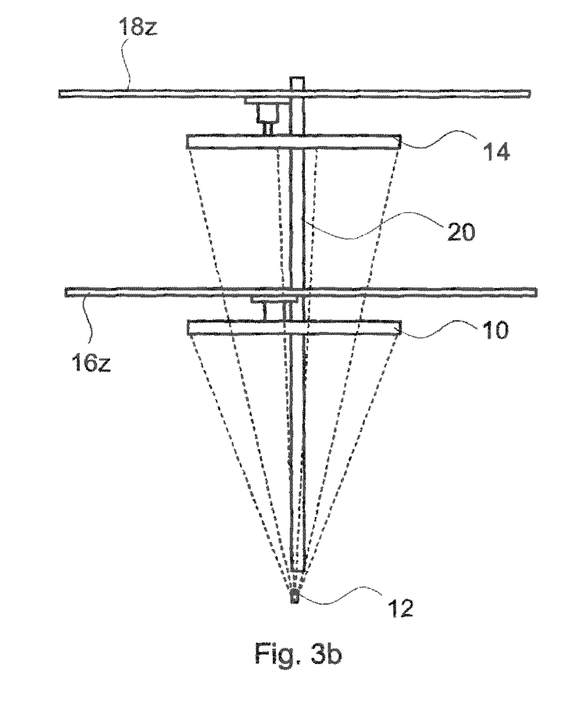
FIG. 3b shows a schematic top view of the X-ray scattering apparatus in the $3^{rd}$ position.

FIGS. 3a and 3b show a schematic side view and top view, respectively, of the X-ray scattering apparatus in a $3^{rd}$ position which is another example of the $1^{st}$ measurement configuration in which the distal X-ray detector 14 is arranged downstream of the proximal X-ray detector 10. Compared to the $1^{st}$ position shown in FIGS. 1a and 1b the distal X-ray detector 14 is essentially arranged at the same distance from the sample 12 whereas the proximal X-ray detector 10 is positioned further downstream. In this $3^{rd}$ position the X-ray scattering apparatus according to the invention allows to detect a particularly wide angular range of SAXS signals, or to detect X-rays scattered between the SAXS and the WAXS domain.

Figure 3C:
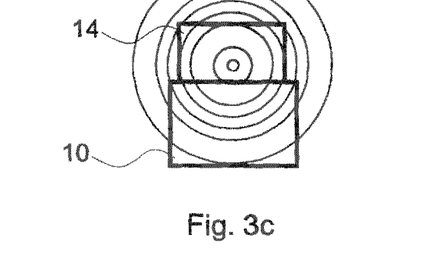
FIG. 3c shows a schematic front view of the two detectors of the apparatus, the scattered X-ray wave field and the direct beam in the $3^{rd}$ position.

This is graphically indicated in FIG. 3c which shows a schematic front view of the two detectors 10, 14 of the apparatus, the scattered X-ray wave field and the direct beam in the $3^{rd}$ position. The distal X-ray detector 14 is represented slightly smaller than the proximal X-ray detector 10 as a consequence of its slightly larger distance from the sample 12. The fact that the proximal X-ray detector 10, compared to its pure WAXS operation in FIGS. 1a and 1b, is rather located between the SAXS and the WAXS domain in the FIGS. 3a and 3b is graphically indicated by the fact that the circles representing the same scattered wave field as in FIG. 1c cover the entire sensor surface of the proximal X-ray detector 10 in FIG. 3c whereas they essentially only cover its upper half in FIG. 1c.

Figure 4A:
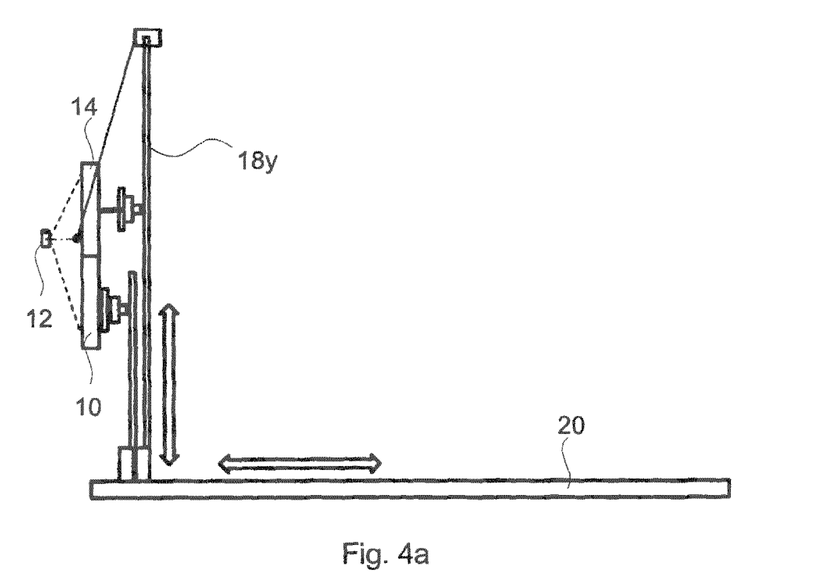
FIG. 4a shows a schematic side view of the X-ray scattering apparatus in a $4^{th}$ position.

FIG. 4a shows a schematic side view of the X-ray scattering apparatus in a $4^{th}$ position which is another example of the $2^{nd}$ measurement configuration in which the distal X-ray detector 14 and the proximal X-ray detector 10 are located at approximately equal distances from the sample holder. Compared to the $2^{nd}$ position shown in FIGS. 2a and 2b the two detectors 10, 14 are positioned further upstream allowing to detect a large azimuthal range of X-rays scattered in the WAXS domain.

Figure 4B:
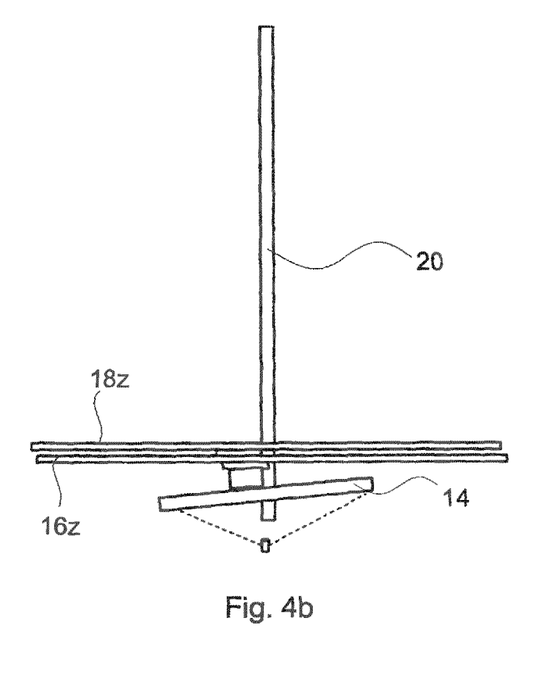
FIG. 4b shows a schematic top view of the X-ray scattering apparatus in a $5^{th}$ position which differs from the $4^{th}$ position in that the two detectors are tilted.
Figure 4C:
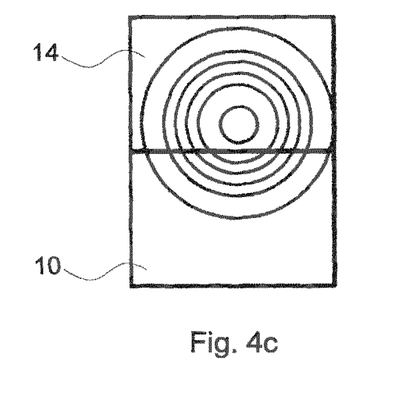
FIG. 4c shows a schematic front view of the two detectors of the apparatus, the scattered X-ray wave field and the direct beam in the $4^{th}$ position.

FIG. 4b shows a schematic top view of the X-ray scattering apparatus in a $5^{th}$ position which slightly differs from the $4^{th}$ position shown in FIG. 4a in that both detectors 10, 14 are tilted about the Y axis. When combined with an additional displacement of the corresponding detector 10, 14 along the Z direction such tilt allows to always direct the normal of the detection surface towards the sample 12. In other words, it can be assured that the corresponding detector 10, 14 always "looks at" the sample 12. The $5^{th}$ position shown in FIG. 4b is another example of the $2^{nd}$ measurement configuration in which the distal X-ray detector 14 and the proximal X-ray detector 10 are located at approximately equal distances from the sample holder. In a preferred embodiment both detectors or at least the proximal X-ray detector are tilted about the Z axis, in order to increase the larger maximum scattered angles $2\theta_{pmax}$, $2\theta_{dmax}$ In each of the positions shown in the figures the detectors 10, 14 may be positioned with an overlap such as to avoid any gaps in the range of detected scattering and/or azimuthal angles. Multiple exposures with detectors 10, 14 at different sample-to-sensor-distances are also possible. Furthermore the translational displacement of the detectors 10, 14 in the Y-Z-plane perpendicular to the propagation direction of the direct X-ray beam and potential additional tilt displacements about the Y or Z axis can be used to detect the scattering signal over a larger surface and corresponding range of scattering and azimuth angles, thereby emulating the use of a much larger sensor.

The invention claimed is:
1. An X-ray scattering apparatus, comprising:
a sample holder for aligning and orienting a sample (12) to be analyzed by X-ray scattering;
an X-ray beam delivery system arranged upstream of the sample holder for generating and directing an X-ray beam along a propagation direction (X) towards the sample holder;
a proximal X-ray detector (10) arranged downstream of the sample holder such as to let the direct X-ray beam pass and detect X rays scattered from the sample (12); and
a distal X-ray detector (14) arranged downstream of the sample holder and movable along the propagation direction (X) of the direct X-ray beam, wherein the proximal X-ray detector (10) is also movable along the propagation direction (X) of the direct X-ray beam, wherein the proximal X-ray detector (10) and the distal X-ray detector (14) are movable with respect to each other between at least one first measurement configuration in which the distal X-ray detector (14) is arranged downstream of the proximal X-ray detector (10) and at least one second measurement configuration in which the distal X-ray detector (14) and the proximal X-ray detector (10) are located at approximately equal distances from the sample holder.

2. The X-ray scattering apparatus according to claim 1, wherein in the at least one first measurement configuration the distances of the proximal and the distal X-ray detectors from the sample holder are selected such that the proximal X-ray detector (10) allows measurement of wide angle x-ray scattering (WAXS) scattering signals and the distal X-ray detector (14) allows measurement of small angle x-ray scattering (SAXS) scattering signals.

3. The X-ray scattering apparatus according to claim 1, wherein in the at least one second measurement configuration the proximal and the distal X-ray detectors are arranged such as to form a joint X-ray detector.

4. The X-ray scattering apparatus according to claim 3, wherein in the at least one second measurement configuration individual detection surfaces of the proximal and the distal X-ray detectors form a continuous joint detection surface of the joint X-ray detector.

5. The X-ray scattering apparatus according to claim 4, wherein in the at least one second measurement configuration the proximal X-ray detector (10) is located slightly closer to the sample (12) than the distal X-ray detector (14).

6. The X-ray scattering apparatus according to claim 3, wherein in the at least one second measurement configuration the center of the joint X-ray detector coincides with a projection of the direct X-ray beam.

7. The X-ray scattering apparatus according to claim 1, furthermore comprising a beam stop for preventing the direct X-ray beam from reaching the distal X-ray detector (14), wherein said beam stop is mounted such that it is displaced together with the distal X-ray detector (14) when said distal X-ray detector (14) is moved along the propagation direction (X) of the direct X-ray beam.

8. The X-ray scattering apparatus according to claim 7, wherein the proximal X-ray detector (10) and/or the distal X-ray detector (14) is furthermore movable in a plane (YZ) orthogonal to the propagation direction (X) of the direct X-ray beam.

9. The X-ray scattering apparatus according to claim 8, wherein said beam stop is mounted such that it is not displaced together with the distal X-ray detector (14) when said distal X-ray detector (14) is moved in said plane (YZ) orthogonal to the propagation direction (X) of the direct X-ray beam.

10. The X-ray scattering apparatus according to claim 8 wherein the proximal X-ray detector (10) and/or the distal X-ray detector (14) is tiltable such that a normal to its detection surface is directed to the sample holder.

11. The X-ray scattering apparatus according to claim 1, wherein the proximal X-ray detector (10) and the distal X-ray detector (14) are each movable on respective individual rails or are both movable on a common rail.

12. The X-ray scattering apparatus according to claim 1, wherein the proximal X-ray detector (10) and/or the distal X-ray detector (14) comprises an X-ray sensor movable along the propagation direction (X) of the direct X-ray beam connected to counting electronics at least part of which is located at a different position than the X-ray sensor.

13. The X-ray scattering apparatus according to claim 12, wherein the part of the counting electronics of the movable X-ray sensors of the proximal X-ray detector (10) and/or the distal X-ray detector (14) which is located at a different position than the respective X-ray sensor is a common part to both X-ray detectors.

14. The X-ray scattering apparatus according to claim 12, wherein the detection surfaces of the movable X-ray sensors are limited on at least one side by only the borders of the active areas of the respective sensors.

15. The X-ray scattering apparatus according to claim 1, wherein the proximal X-ray detector (10) and/or the distal X-ray detector (14) is furthermore rotatable about at least one axis lying in the plane (YZ) orthogonal to the propagation direction (X) of the direct X-ray beam.

* * * * *